United States Patent Office 3,384,500
Patented May 21, 1968

3,384,500
REFRACTORY
Robert F. Patrick, Louisville, Ky., and Thomas M. Wehrenberg, Buckhannon, W. Va., assignors to Corhart Refractories Company, Inc., Louisville, Ky., a corporation of Delaware
No Drawing. Filed Feb. 24, 1965, Ser. No. 435,083
9 Claims. (Cl. 106—59)

The present invention relates to nonacid and/or basic refractory batches and mixes for the production of refractory articles and linings, and to such articles and linings per se.

During the past decade and a half, production and industrial use of basic fused cast refractory material in the form of as-solidified monolithic billets or blocks cut therefrom has grown considerably, especially of the compositions disclosed in U.S. Patents 2,599,566 and 3,132,954. Fused cast refractory, as has been known as early as U.S. Patent 2,019,208, is that type of refractory material derived by completely melting a mass of refractory raw material and then solidifying the molten mass as desired, for example, by casting into preformed molds or by progressively solidifying in situ in the melting furnace so as to build up a block to the desired thickness. As is not uncommon in manufacturing processes, a not insubstantial amount of scrap or waste fused cast refractory material is produced as a by-product along with good billet and/or block product. Such scrap material commonly comprises font headers, defective castings, pieces of unusable sizes resulting from the cutting of special shape bricks from billets, etc. Commonly in the past, this scrap material was reused as a cullet addition in the batch mixtures employed in the fusion casting process.

In view of the greater cost involved in producing fused cast refractory material, it was questioned whether a considerable processing economy could be attained with correspondingly cheaper products of comparable service characteristics if the fused cast refractory scrap material could be put back together (or rebonded) by one or more of the less expensive techniques (e.g. pressing and burning, chemical bonding, tar bonding, etc.) in a manner such that the resulting product in service would have substantially the same physical and chemical properties as the solidified monolithic fused cast blocks, such as very dense and low porosity structure, tight and direct crystalline bonding, high hot strength, chemical corrosion-erosion resistance, and thermal shock resistance. Efforts in this direction demonstrated that one of the principal difficulties was the inability to attain the substantially same dense, low porosity, tightly bonded structure. Notably these deficiencies occurred when the scrap material was crushed and milled without screening as well as with screening to a number of different particle sizes distributions or fractions.

We have now discovered that, for certain analytical compositions of fused cast refractory material, the foregoing difficulties can be overcome, and that chemical and physical properties approaching those of solidified monolithic blocks of corresponding composition can be obtained by providing in the batch, mix, article and/or lining refractory ingredients or aggregates that consist essentially of a screened mixture of fused cast refractory particles such that:

(1) the mixture of particles is composed of, by weight, 40 to 70% of coarse particles, 0 to 20% of medium particles and 20 to 50% of fine particles, (2) the coarse particles have a cumulative particle size distribution as follows:

| | Particle Size (microns) | Cumulative percent by weight left on screen | |
|---|---|---|---|
| | | Maximum | Minimum |
| Tyler Mesh No.: | | | |
| 4 | 4,760 | 0 | 0 |
| 6 | 3,360 | 16 | 6 |
| 8 | 2,380 | 52 | 44 |
| 10 | 1,680 | 84 | 78 |
| 12 | 1,410 | 94 | 90 |
| 20 | 840 | 99 | 99 |

(3) the medium particles have a cumulative particle size distribution as follows:

| | Particle Size (microns) | Cumulative percent by weight left on screen | |
|---|---|---|---|
| | | Maximum | Minimum |
| Tyler Mesh No.: | | | |
| 10 | 1,680 | 0 | 0 |
| 14 | 1,190 | 16 | 8 |
| 28 | 590 | 81 | 75 |
| 35 | 420 | 95 | 91 | and (4) the fine particles have a cumulative particle size distribution as follows:

| | Particle Size (microns) | Cumulative percent by weight left on screen | |
|---|---|---|---|
| | | Maximum | Minimum |
| Tyler Mesh No.: | | | |
| 35 | 420 | 0 | 0 |
| 60 | 250 | 2 | 0 |
| 65 | 210 | 3 | 1 |
| 80 | 177 | 4 | 2 |
| 100 | 149 | 6 | 3 |
| 150 | 105 | 12 | 4 |
| 200 | 74 | 18 | 10 |
| 325 | 44 | 28 | 20 |

As will be apparent, each preceding weight percent portion of larger particles for each category of particles is cumulatively included in the succeeding weight percent portion of smaller particles. For example, in the coarse particle category or fraction, if the amount of particles left on the 6 mesh screen is 10%, the amount of particles left on the 8 mesh screen would be the 10% of +6 mesh particles plus the additional amount of particles that passed through the 6 mesh screen but could not pass through the 8 mesh screen.

The composition of the fused cast refractory particles employed in this invention broadly and analytically consists essentially of, by weight, at least 40% MgO and at least one other constituent selected from the group consisting of: (1) less than 30% oxide selected from the group consisting of FeO, CaO, BaO, SrO and mixtures thereof, (2) up to 58% $Cr_2O_3$, (3) up to 40% $Al_2O_3$, (4) up to 18% $TiO_2$, (5) not more than 5% $SiO_2$ and (6) up to 7% fluorine, provided that the sum of MgO plus the other constituent or constituents amounts to at least 95% of the particles composition.

For a variety of applications in steelmaking furnaces or vessels, copper producing furnaces and cement producing kilns, the composition of the particles desirably consists essentially of, by weight, 50 to 70% MgO, 3 to 18% FeO, not more than 2% CaO, 10 to 25% $Cr_2O_3$, not more than 15% $Al_2O_3$, not more than 5% $TiO_2$, not more than 3% $SiO_2$ and not more than 2% fluorine, provided the sum of these named constituents is at least 95%.

For certain special applications, as in basic oxygen steelmaking vessels utilizing high lime-silica ratio slags, the composition of the refractory particles desirably consists essentially of, by weight, at least 75% MgO, not more than 5% oxide selected from the group consisting of FeO, CaO, BaO, SrO and mixtures thereof, not more than 15% $Cr_2O_3$ and 10 to 18% $TiO_2$, provided the sum of these named constituents is at least 95%.

Especially good results according to this invention have been obtained when the mixture of particles is composed of, by weight, 60 to 65% of the coarse particles, 5 to 10% of the medium particles and 25 to 35% of the fine particles, particularly with a composition as set forth in the next to last preceding paragraph.

As an example of the production of a burned refractory brick according to this invention, scrap fused cast refractory was employed having the following approximate composition, by weight: 56.7% MgO, 10.0% FeO, 0.5% CaO, 20.0% $Cr_2O_3$, 9.0% $Al_2O_3$, 1.0% $TiO_2$, 2.5% $SiO_2$ and 0.3% fluorine. This scrap material was crushed, milled and screened to produce a particle mixture composed of, by weight, approximately 60% coarse particles, 10% medium particles and 30% fine particles. The approximate cumulative particle size distributions were as follows:

| Coarse | | Medium | | Fine | |
|---|---|---|---|---|---|
| Tyler Mesh No. | Cumulative, weight percent | Tyler Mesh No. | Cumulative, weight percent | Tyler Mesh No. | Cumulative, weight percent |
| 4 | 0 | 10 | 0 | 35 | 0 |
| 6 | 10 | 14 | 10 | 60 | 1 |
| 8 | 50 | 28 | 80 | 65 | 2 |
| 10 | 80 | 35 | 95 | 80 | 3 |
| 12 | 90 | | | 100 | 5 |
| 20 | 99 | | | 150 | 10 |
| | | | | 200 | 15 |
| | | | | 325 | 25 |

This particle mixture was then thoroughly mixed with 2.1% by weight of water-soluble, waxy polyethylene glycol having an average molecular weight of 3000–3700 and with 0.75% by weight of a calcium-magnesium lignin sulfonate binder having a specific gravity at 60° F. of about 1.27, a pH of 6.9–7.1 and having the following approximate composition, by weight: 5.8% ash, 0.009% iron, 3.36% CaO, 0.74% MgO, 9.15% total sugars calculated as dextrose, 48% water and 52% total, soluble solids.

The resulting mixture was readily pressed or hand rammed into green bodies ranging from 10 pound simple brick shapes to 300 pound more complex shapes. Other waxy or liquid polyethylene glycols commonly employed in the ceramics and refractory arts can also be used, generally in amounts of 0.5 to 3% by weight. Likewise any other common lignin sulfite binders can be employed preferably in amounts of 0.4 to 1.5% by weight.

The pressed, unfired green bodies were then fired to 1565° to 1600° C. for about 6 to 8 hours to develop a dense, tightly direct bonded structure composed principally of complex primary spinel crystals and periclase crystals containing FeO in solid solution plus fine exsolved spinel crystals included therein. Also present in a minor amount of isolated areas of crystalline silicate. Comparative typical properties of these burned, rebonded fused cast grain bodies and of solidified monolithic fused cast blocks of corresponding composition are set forth below in the table.

The fused cast refractory particle mixture according to this invention can also be employed with similar advantages in making unburned, bonded refractory bricks or other articles as well as ramming or casting mixes and monolithic refractory linings from such mixes. As is well known, these unburned articles or linings are not fired prior to use or installation and, therefore, they have to be provided with adequate bonding and mechanical strength

TABLE

| Property | Rebonded Fused Grain Body | Fused Cast Block |
|---|---|---|
| Bulk Density (lbs./cu. ft.) | 204 | 194 |
| Apparent Porosity (percent) | 14 | 12 |
| Modulus of Rupture in flexure (p.s.i.): | | |
| Room temperature | 2,000 | 1,600 |
| 1,340° C | 1,450 | 2,500 |
| 1,500° C | 1,000 | 1,800 |
| Hot Load Strength (° C. at point of 5% deformation under 25 p.s.i. compressive load) | 1,965 | 2,080 |
| Reheat Change (percent dimensional change resulting from heating at 1,760° C. for 5 hrs. and cooling) | +0.4 | +1.0 |
| Cyclic Growth (percent dimensional change resulting from cycled heating between 1,250° C. and 1,650° C. for 7 cycles of 10.3 hours duration each cycle) | +0.8 | +1.4 |
| Iron Oxide Bursting Expansion (percent dimensional change resulting from heating at 1,600° C. for 3 hrs. in contact with $Fe_2O_3$) | +0.4 | +1.7 |
| Thermal Shock (No. of cycles-heating and cooling between room temp. and 1,400° C. until first spall occurs) | 7 | 3 | prior to in situ firing during use or after installation. This can be accomplished by the well-known techniques of mixing the refractory particle mixture or aggregate with a suitable inorganic (chemical) or organic bonding agent (plus sufficient water, e.g. 2–5 wt. percent or so, in appropriate cases, of course, to render the mixture plastic for pressing or forming) and then pressing, ramming or molding to the desired shape. Among the known bonding agents applicable for this purpose are sulfuric acid, magnesium sulfate, sodium acid sulfate, sulfite liquors (lignin paper waste), hydrochloric acid, magnesium chloride, chromic acid, sodium chromates, sodium silicate, quick-setting cements, carbohydrates (dextrine, starch sugar), linseed oil, pitch, tar, tall oil and the like. Generally, the amount of bonding agent is about 0.5 to 8% by weight of the refractory aggregate, although it is usually preferable to keep it in the range of 2 to 5% by weight. In some cases, it may also be beneficial to add a small amount of a humectant (e.g. 0.5–1.5% by weight of glycerin, ethylene or propylene glycols) to prevent drying cracks and/or a small amount of a wetting agent (e.g. 0.005 wt. percent or more of dioctyl sodium sulfosuccinate) to minimize the amount of binding agent and/or a small amount of a plasticizing agent (e.g. 2 to 3 wt. percent of a clay material). After pressing, ramming or molding, the shaped article or lining is then dried (except in such cases as where liquid pitch is used, but no water is employed) to remove moisture and to develop or set the bond. As is known, casting mixes are similar in formulation to ramming mixes with the exception that sufficient additional liquid or water is included so that the material can be flowed into place rather than being tamped or rammed.

As an example of an unburned, bonded refractory product according to this invention and a mix therefor, a fused cast refractory particle mixture or aggregate as described in the previous example was mixed with a sodium silicate binding agent. This binding agent was an aqueous solution containing about 13.5% $Na_2O$ and about 33% $SiO_2$ (soda to silica ratio of 1:2.4), and the solution had a specific gravity at 68° F. of about 52° Baumé and a viscosity at 68° F. of about 2100 centipoises. The molding mix was formed, based on the weight of the total mix, with 7% by weight of this sodium silicate solution, 1% by weight of glycerin and 0.05% by weight of a 10% aqueous solution of dioctyl sodium sulfosuccinate, which latter solution had a specific gravity at 72° F. of 1.03. After hand ramming this mix to the desired shape, the resulting body was dried to a crack-free, firmly bonded product.

As a further example of this invention, fused cast refractory grain or particles having a composition consisting essentially of, by weight, 15.2% $TiO_2$, 0.86% CaO and the balance MgO plus incidental impurities can be substituted for the composition of the previous two examples. With the particle size mixture and cumulative distribution substantially the same as in the previous examples, burned and unburned products can be obtained with chemical and physical characteristics approaching those of a solidified, monolithic, fused cast block of corresponding composition.

If desired, refractory brick products according to this invention can be provided with oxidizable metal, e.g. steel, coverings or casings on one or more external surfaces, either applied after the bricks are molded to shape or comolded with the refractory mix, with or without internally comolded oxidizable plates, wires or the like, to gain additional assurance against spalling as is known in the art.

It will be appreciated that the invention is not limited to the specific details set forth in the examples and illustrations, except insofar as is specified in the claims, and that various changes or modifications to meet individual whim or particular need may be made to obtain all or part of the benefits of this invention without departing from the reasonable spirit and scope of the claims therefor.

We claim:

1. A batch for the production of refractory articles and linings in which the refractory ingredients thereof consist essentially of a mixture of fused cast refractory particles,
   (a) said particles analytically consisting esentially of, by weight, at least 40% MgO and at least one other constituent selected from the group consisting of: (1) less than 30% oxide selected from the group consisting of FeO, CaO, BaO, SrO and mixtures thereof, (2) up to 58% $Cr_2O_3$, (3) up to 40% $Al_2O_3$, (4) up to 18% $TiO_2$, (5) not more than 5% $SiO_2$ and (6) up to 7% fluorine, the sum of MgO plus said other constituent or constituents being at least 95% of said particles,
   (b) said mixture of particles being composed of, by weight, 40 to 70% of coarse particles, 0 to 20% of medium particles and 20 to 50% of fine particles,
   (c) said coarse particles having a cumulative particle size distribution as follows:

| Particle Size (microns) | Cumulative percent by weight left on screen | |
| --- | --- | --- |
| | Maximum | Minimum |
| Tyler Mesh No.: | | |
| 4 | 4,760 | 0 | 0 |
| 6 | 3,360 | 16 | 6 |
| 8 | 2,380 | 52 | 44 |
| 10 | 1,680 | 84 | 78 |
| 12 | 1,410 | 94 | 90 |
| 20 | 840 | 99 | 99 |

(d) said medium particles having a cumulative particle size distribution as follows:

| Particle Size (microns) | Cumulative percent by weight left on screen | |
| --- | --- | --- |
| | Maximum | Minimum |
| Tyler Mesh No.: | | |
| 10 | 1,680 | 0 | 0 |
| 14 | 1,190 | 16 | 8 |
| 28 | 590 | 81 | 75 |
| 35 | 520 | 95 | 91 |

(e) said fine particles having a cumulative particle size distribution as follows:

| Particle Size (microns) | Cumulative percent by weight left on screen | |
| --- | --- | --- |
| | Maximum | Minimum |
| Tyler Mesh No.: | | |
| 35 | 420 | 0 | 0 |
| 60 | 250 | 2 | 0 |
| 65 | 210 | 3 | 1 |
| 80 | 177 | 4 | 2 |
| 100 | 149 | 6 | 3 |
| 150 | 105 | 12 | 4 |
| 200 | 74 | 18 | 10 |
| 325 | 44 | 28 | 20 |

2. A batch of claim 1 in which said particles analytically consist essentially of, by weight, 50 to 70% MgO, 3 to 18% FeO, not more than 2% CaO, 10 to 25% $Cr_2O_3$, not more than 15% $Al_2O_3$, not more than 5% $TiO_2$, not more than 3 $SiO_2$ and not more than 2% fluorine.

3. A batch of claim 1 in which said particles analytically consist essentially of, by weight, at least 75% MgO, not more than 5% oxide selected from the group consisting of FeO, CaO, BaO, SrO and mixtures thereof, not more than 15% $Cr_2O_3$ and 10 to 18% $TiO_2$.

4. A batch of claim 1 in which said mixture of particles is composed of, by weight, 60 to 65% of said coarse particles, 5 to 10% of said medium particles and 25 to 35% of said fine particles.

5. A refractory article in which the refractory aggregate thereof consists essentially of a mixture of fused cast refractory particles,
   (a) said particles analytically consisting essentially of, by weight, at least 40% MgO and at least one other constituent selected from the group consisting of: (1) less than 30% oxide selected from the group consisting of FeO, CaO, BaO, SrO and mixtures thereof, (2) up to 58% $Cr_2O_3$, (3) up to 40% $Al_2O_3$, (4) up to 18% $TiO_2$, (5) not more than 5% $SiO_2$ and (6) up to 7% fluorine, the sum of MgO plus said other constituent or constituents being at least 95% of said particles,
   (b) said mixture of particles being composed of, by weight, 50 to 70% of coarse particles, 0 to 20% of medium particles and 20 to 50% of fine particles,
   (c) said coarse particles having a cumulative particle size distribution as follows:

| Particle Size (microns) | Cumulative percent by weight left on screen | |
| --- | --- | --- |
| | Maximum | Minimum |
| Tyler Mesh No.: | | |
| 4 | 4,760 | 0 | 0 |
| 6 | 3,360 | 16 | 6 |
| 8 | 2,380 | 52 | 44 |
| 10 | 1,680 | 84 | 78 |
| 12 | 1,410 | 94 | 90 |
| 20 | 840 | 99 | 99 |

(d) said medium particles having a cumulative particle size distribution as follows:

| Particle Size (microns) | Cumulative percent by weight left on screen | |
| --- | --- | --- |
| | Maximum | Minimum |
| Tyler Mesh No.: | | |
| 10 | 1,680 | 0 | 0 |
| 14 | 1,190 | 16 | 8 |
| 28 | 590 | 81 | 75 |
| 35 | 420 | 95 | 91 |

(e) said fine particles having a cumulative particle size distribution as follows:

| Particle Size (microns) | Cumulative percent by weight left on screen | |
| --- | --- | --- |
| | Maximum | Minimum |
| Tyler Mesh No.: | | |
| 35 | 420 | 0 | 0 |
| 60 | 250 | 2 | 0 |
| 65 | 210 | 3 | 1 |
| 80 | 177 | 4 | 2 |
| 100 | 149 | 6 | 3 |
| 150 | 105 | 12 | 4 |
| 200 | 74 | 18 | 10 |
| 325 | 44 | 28 | 20 |

6. A burned refractory article comprising a pressed and fired refractory aggregate, said aggregate consisting essentially of a mixture of fused cast refractory particles,
   (a) said particles analytically consisting essentially of, by weight, at least 40% MgO and at least one other constituent selected from the group consisting of: (1) less than 30% oxide selected from the group consisting of FeO, CaO, BaO, SrO and mixtures thereof, (2) up to 58% $Cr_2O_3$, (3) up to 40% $Al_2O_3$, (4) up to 18% $TiO_2$, (5) not more than 5% $SiO_2$ and (6) up to 7% fluorine, the sum of MgO plus said other constituent or constituents being at least 95% of said particles, (b) said mixture of particles being composed of, by weight, 40 to 70% of coarse particles, 0 to 20% of medium particles and 20 to 50% of fine particles, (c) said coarse particles having a cumulative particle size distribution as follows:

| Tyler Mesh No.: | Particle Size (microns) | Cumulative percent by weight left on screen | |
|---|---|---|---|
| | | Maximum | Minimum |
| 4 | 4,760 | 0 | 0 |
| 6 | 3,360 | 16 | 6 |
| 8 | 2,380 | 52 | 44 |
| 10 | 1,680 | 84 | 78 |
| 12 | 1,410 | 94 | 90 |
| 20 | 840 | 99 | 99 |

(d) said medium particles having a cumulative particle size distribution as follows:

| Tyler Mesh No.: | Particle Size (microns) | Cumulative percent by weight left on screen | |
|---|---|---|---|
| | | Maximum | Minimum |
| 10 | 1,680 | 0 | 0 |
| 14 | 1,190 | 16 | 8 |
| 28 | 590 | 81 | 75 |
| 35 | 420 | 95 | 91 |

(e) said fine particles having a cumulative particle size distribution as follows:

| Tyler Mesh No.: | Particle Size (microns) | Cumulative percent by weight left on screen | |
|---|---|---|---|
| | | Maximum | Minimum |
| 35 | 420 | 0 | 0 |
| 60 | 250 | 2 | 0 |
| 65 | 210 | 3 | 1 |
| 80 | 177 | 4 | 2 |
| 100 | 149 | 6 | 3 |
| 150 | 105 | 12 | 4 |
| 200 | 74 | 18 | 10 |
| 325 | 44 | 28 | 20 |

7. An unburned, bonded refractory article comprising molded mixture of refractory aggregate and bonding substance, said aggregate consisting essentially of a mixture of fused cast refractory particles, (a) said particles analytically consisting essentially of, by weight, at least 40% MgO and at least one other constituent selected from the group consisting of: (1) less than 30% oxide selected from the group consisting of FeO, CaO, BaO, SrO and mixtures thereof, (2) up to 58% $CrO_3$, (3) up to 40% $Al_2O_3$, (4) up to 18% $TiO_2$ (5) not more than 5% $SiO_2$ and (6) up to 7% fluorine, the sum of MgO plus said other constituent or constituents being at least 95% of said particles, (b) said mixture of particles being composed of, by weight, 40 to 70% of coarse particles, 0 to 20% of medium particles and 20 to 50% of fine particles, (c) said coarse particles having a cumulative particle size distribution as follows:

| Tyler Mesh No.: | Particle Size (microns) | Cumulative percent by weight left on screen | |
|---|---|---|---|
| | | Maximum | Minimum |
| 4 | 4,760 | 0 | 0 |
| 6 | 3,360 | 16 | 6 |
| 8 | 2,380 | 52 | 44 |
| 10 | 1,680 | 84 | 78 |
| 12 | 1,410 | 94 | 90 |
| 20 | 840 | 99 | 99 |

(d) said medium particles having a cumulative particle size distribution as follows:

| Tyler Mesh No.: | Particle Size (microns) | Cumulative percent by weight left on screen | |
|---|---|---|---|
| | | Maximum | Minimum |
| 10 | 1,680 | 0 | 0 |
| 14 | 1,190 | 16 | 8 |
| 28 | 590 | 81 | 75 |
| 35 | 420 | 95 | 91 |

(e) said fine particles having a cumulative particle size distribution as follows:

| Tyler Mesh No.: | Particle Size (microns) | Cumulative percent by weight left on screen | |
|---|---|---|---|
| | | Maximum | Minimum |
| 35 | 420 | 0 | 0 |
| 60 | 250 | 2 | 0 |
| 65 | 210 | 3 | 1 |
| 80 | 177 | 4 | 2 |
| 100 | 149 | 6 | 3 |
| 150 | 105 | 12 | 4 |
| 200 | 74 | 18 | 10 |
| 325 | 44 | 28 | 20 |

8. A refractory ramming and casting mix comprising refractory aggregate and plastic bonding substance, said aggregate consisting essentially of a mixture of fused refractory particles, (a) said particles analytically consisting essentially of, by weight, at least 40% MgO and at least one other constituent selected from the group consisting of: (1) less than 30% oxide selected from the group consisting of FeO, CaO, BaO, SrO and mixtures thereof, (2) up to 58% $Cr_2O_3$, (3) up to 40% $Al_2O_3$, (4) up to 18% $TiO_2$, (5) not more than 5% $SiO_2$ and (6) up to 7% fluorine, the sum of MgO plus said other constituent or constituents being at least 95% of said particles, (b) said mixture of particles being composed of, by weight, 40 to 70% of coarse particles, 0 to 20% of medium particles and 20 to 50% of fine particles, (c) said coarse particles having a cumulative particle size distribution as follows:

| Tyler Mesh No.: | Particle Size (microns) | Cumulative percent by weight left on screen | |
|---|---|---|---|
| | | Maximum | Minimum |
| 4 | 4,760 | 0 | 0 |
| 6 | 3,360 | 16 | 6 |
| 8 | 2,380 | 52 | 44 |
| 10 | 1,680 | 84 | 78 |
| 12 | 1,410 | 94 | 90 |
| 20 | 840 | 99 | 99 |

(d) said medium particles having a cumulative particle size distribution as follows:

| Tyler Mesh No.: | Particle Size (microns) | Cumulative percent by weight left on screen | |
|---|---|---|---|
| | | Maximum | Minimum |
| 10 | 1,680 | 0 | 0 |
| 14 | 1,190 | 16 | 8 |
| 28 | 590 | 81 | 75 |
| 35 | 420 | 95 | 91 |

(e) said fine particles having a cumulative particle size distribution as follows:

| Tyler Mesh No.: | Particle Size (microns) | Cumulative percent by weight left on screen | |
|---|---|---|---|
| | | Maximum | Minimum |
| 35 | 420 | 0 | 0 |
| 60 | 250 | 2 | 0 |
| 65 | 210 | 3 | 1 |
| 80 | 177 | 4 | 2 |
| 100 | 149 | 6 | 3 |
| 150 | 105 | 12 | 4 |
| 200 | 74 | 18 | 10 |
| 325 | 44 | 28 | 20 |

9. A monolithic refractory lining comprising a set, molded mixture of refractory aggregate and bonding substance, said aggregate consisting essentially of a mixture of fused cast refractory particles,
(a) said particles analytically consisting essentially of, by weight, at least 40% MgO and at least one other constituent selected from the group consisting of: (1) less than 30% oxide selected from the group consisting of FeO, CaO, BaO, SrO and mixtures thereof, (2) up to 58% $Cr_2O_3$, (3) up to 40% $Al_2O_3$, (4) up to 18% $TiO_2$, (5) not more than 5% $SiO_2$ and (6) up to 7% fluorine, the sum of MgO plus said other constituent or constituents being at least 95% of said particles,
(b) said mixture of particles being composed of, by weight, 40 to 70% of coarse particles, 0 to 20% of medium particles and 20 to 50% of fine particles,
(c) said coarse particles having a cumulative particle size distribution as follows:

| | Particle Size (microns) | Cumulative percent by weight left on screen | |
|---|---|---|---|
| | | Maximum | Minimum |
| Tyler Mesh No.: | | | |
| 4 | 4,760 | 0 | 0 |
| 6 | 3,360 | 16 | 6 |
| 8 | 2,380 | 52 | 44 |
| 10 | 1,680 | 84 | 78 |
| 12 | 1,410 | 94 | 90 |
| 20 | 840 | 99 | 99 |

(d) said medium particles having a cumulative particle size distribution as follows:

| | Particle Size (microns) | Cumulative percent by weight left on screen | |
|---|---|---|---|
| | | Maximum | Minimum |
| Tyler Mesh No.: | | | |
| 10 | 1,680 | 0 | 0 |
| 14 | 1,190 | 16 | 8 |
| 28 | 590 | 81 | 75 |
| 35 | 420 | 95 | 91 |

(e) said fine particles having a cumulative particle size distribution as follows:

| | Particle Size (microns) | Cumulative percent by weight left on screen | |
|---|---|---|---|
| | | Maximum | Minimum |
| Tyler Mesh No.: | | | |
| 35 | 420 | 0 | 0 |
| 60 | 250 | 2 | 0 |
| 65 | 210 | 3 | 1 |
| 80 | 177 | 4 | 2 |
| 100 | 149 | 6 | 3 |
| 150 | 105 | 12 | 4 |
| 200 | 74 | 18 | 10 |
| 325 | 44 | 28 | 20 |

References Cited

UNITED STATES PATENTS 3,116,156  12/1963  Charvat _____ 106—59
3,245,811  4/1966  Havranek et al. _____ 106—59

TOBIAS E. LEVOW, *Primary Examiner.*

JAMES E. POER, *Examiner.*

UNITED STATES PATENT OFFICE
CERTIFICATE OF CORRECTION

Patent No. 3,384,500                                May 21, 1968

Robert F. Patrick et al.

It is certified that error appears in the above identified patent and that said Letters Patent are hereby corrected as shown below:

Column 3, line 61, "in" should read -- is --. Column 5, second table, second column, line 4 thereof, "520" should read -- 420 --. Column 6, line 5, "3 $SiO_2$" should read -- 3% $SiO_2$ --. Column 7, line 7, "soarse" should read -- coarse --; line 55, "$CrO_3$" should read -- $Cr_2O_3$ --.

Signed and sealed this 28th day of October 1969.

(SEAL)
Attest:

Edward M. Fletcher, Jr.                        WILLIAM E. SCHUYLER, JR.
Attesting Officer                                   Commissioner of Patents